(12) United States Patent
Zeffer et al.

(10) Patent No.: US 7,480,770 B2
(45) Date of Patent: Jan. 20, 2009

(54) SEMI-BLOCKING DETERMINISTIC DIRECTORY COHERENCE

(75) Inventors: Håkan E. Zeffer, Uppsala (SE); Anders Landin, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 218 days.

(21) Appl. No.: 11/452,647

(22) Filed: Jun. 14, 2006

(65) Prior Publication Data

US 2007/0294485 A1  Dec. 20, 2007

(51) Int. Cl.
*G06F 12/00* (2006.01)
(52) U.S. Cl. ............... 711/141; 711/144; 711/156
(58) Field of Classification Search ......... 711/141, 711/144, 145, 156
See application file for complete search history.

(56) References Cited

U.S. PATENT DOCUMENTS 5,893,160 A  4/1999  Loewenstein et al.
7,032,078 B2 *  4/2006  Cypher et al. ............... 711/141

\* cited by examiner

*Primary Examiner*—Jasmine Song
(74) *Attorney, Agent, or Firm*—Lawrence J. Merkel; Meyertons, Hood, Kivlin, Kowert & Goetzel, P.C.

(57) ABSTRACT

In one embodiment, a node for a multi-node computer system comprises a coherence directory and a coherence controller. The coherence directory comprises a plurality of entries, wherein each entry corresponds to a respective coherence unit and stores a state identifying which nodes in the computer system are storing a copy of the coherence unit and further identifying a coherence state of the coherence unit according to a coherence protocol implemented in the computer system. Coupled to the directory and coupled to receive a first request for a requested coherence unit having a first entry in the coherence directory, the coherence controller is coupled to receive a second request for the requested coherence unit. The coherence controller is configured to selectively initiate coherence activity for the second request, if coherence activity for the first request is not yet complete, dependent on a type of the second request.

20 Claims, 4 Drawing Sheets

SEMI-BLOCKING DETERMINISTIC DIRECTORY COHERENCE

BACKGROUND

1. Field of the Invention

This invention is related to the field of computer systems and, more particularly, to coherence mechanisms in computer systems.

2. Description of the Related Art

Historically, shared memory multiprocessing systems have implemented hardware coherence mechanisms. The hardware coherence mechanisms ensure that updates (stores) to memory locations by one processor (or one process, which may be executed on different processors at different points in time) are consistently observed by all other processors that read (load) the updated memory locations according to a specified ordering model. Implementing coherence may aid the correct and predictable operation of software in a multiprocessing system. While hardware coherence mechanisms simplify the software that executes on the system, the hardware coherence mechanisms may be complex and expensive to implement (especially in terms of design time). Additionally, if errors in the hardware coherence implementation are found, repairing the errors may be costly (if repaired via hardware modification) or limited (if software workarounds are used).

In order to limit the potential for error, computer systems have typically implemented deterministic coherence mechanisms. For example, one coherence mechanism frequently used in a distributed shared memory system (in which nodes are coupled together to form a system, with each node having a local memory that is part of the overall system memory) is directory based. In a directory-based coherence mechanism, each node tracks the coherence state of coherence units in its local memory that are being shared by other nodes (e.g. other nodes may have shared or modified copies of the coherence units). When a request is received for a given coherence unit, a given directory entry corresponding to that coherence unit is blocked so that other requests to the same coherence unit can not be started until the current request completes. This simplifies the mechanism, since coherence activity for more than one request to a given coherence unit does not overlap. However, performance suffers, especially for coherence units that are heavily shared/contended for in the system. Generally, a coherence unit may be any block of data that is treated as a unit for coherence purposes. In many cases, a coherence unit is the same as a cache line, although coherence units may be less than a cache line in size or larger than a cache line in size in various embodiments.

SUMMARY

In one embodiment, a node for a multi-node computer system comprises a coherence directory and a coherence controller. The coherence directory comprises a plurality of entries, wherein each entry corresponds to a respective coherence unit and stores a state identifying which nodes in the computer system are storing a copy of the coherence unit and further identifying a coherence state of the coherence unit according to a coherence protocol implemented in the computer system. Coupled to the directory and coupled to receive a first request for a requested coherence unit having a first entry in the coherence directory, the coherence controller is coupled to receive a second request for the requested coherence unit. The coherence controller is configured to selectively initiate coherence activity for the second request, if coherence activity for the first request is not yet complete, dependent on a type of the second request. In some embodiments, the coherence controller may selectively initiate coherence activity for the second request dependent on the type of the first request as well, if coherence activity for the first request is not yet complete.

In another embodiment, a method comprises: receiving a first request for a requested coherence unit, the requested coherence unit having a corresponding entry in a coherence directory, wherein the corresponding entry stores a state identifying which nodes in a multi-node computer system are storing a copy of the coherence unit and further identifying a coherence state of the coherence unit according to a coherence protocol implemented in the computer system; receiving a second request for the requested coherence unit prior to completing coherence activity for the first request; and selectively initiating coherence activity for the second request, if coherence activity for the first request is not yet complete, dependent on a type of the second request. In some embodiments, the coherence activity for the second request may be selectively initiated dependent on the type of the first request as well, if coherence activity for the first request is not yet complete.

In an embodiment, a system comprises a first node configured to transmit a first request for a requested coherence unit; a second node configured to transmit a second request for the requested coherence unit; and a third node coupled to the first node and the second node. The third node comprises a coherence directory comprising a plurality of entries, wherein each entry corresponds to a respective coherence unit and stores a state identifying which nodes in the system are storing a copy of the coherence unit and further identifying a coherence state of the coherence unit according to a coherence protocol implemented in the system. The third node is configured to initiate coherence activity for the first request. Additionally, the third node is configured to selectively initiate coherence activity for the second request, if coherence activity for the first request is not yet complete, dependent on a type of the second request. In some embodiments, the third node may selectively initiate coherence activity for the second request dependent on the type of the first request as well, if coherence activity for the first request is not yet complete.

BRIEF DESCRIPTION OF THE DRAWINGS

The following detailed description makes reference to the accompanying drawings, which are now briefly described.

Figure 1:
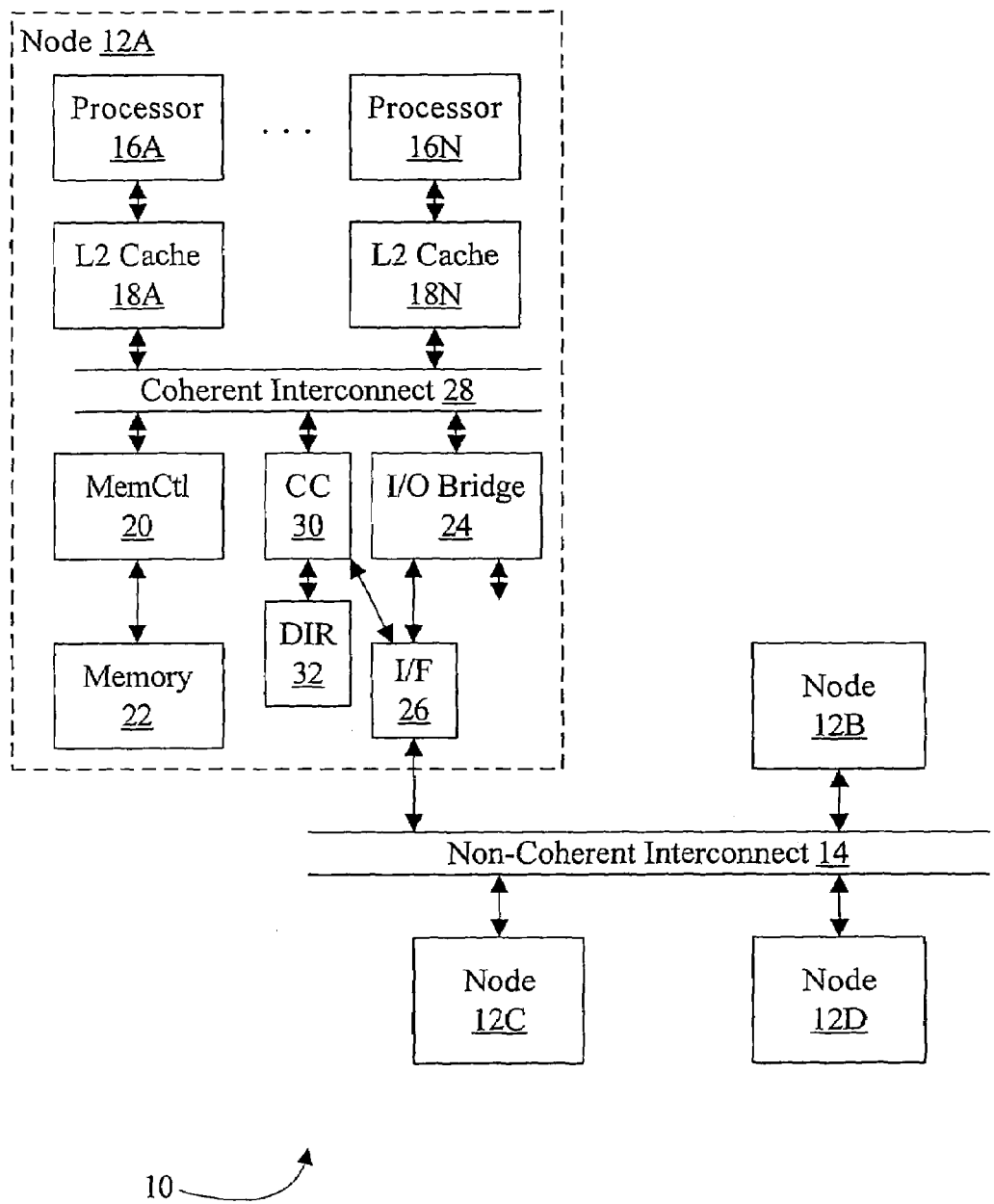
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 comprises a plurality of nodes 12A-12D coupled to a non-coherent interconnect 14. The node 12A is shown in greater detail for one embodiment, and other nodes 12B-12D may be similar. In the illustrated embodiment, the node 12A includes one or more processors 16A-16N, corresponding L2 caches 18A-18N, a memory controller 20 coupled to a memory 22, an input/output (I/O) bridge 24 coupled to one or more I/O interfaces including an interface 26 to the interconnect 14, a coherence controller 30 coupled to the interconnect 28 and a coherence directory 32 coupled to the coherence controller 30. In the illustrated embodiment, the coherence controller 30 is further coupled to the interface 26. In other embodiments, the coherence controller 30 may be coupled to the I/O bridge 24 and/or may be part of the I/O bridge 24 or the interface 26. In the illustrated embodiment, the L2 caches 18A-18N are coupled to respective processors 16A-16N and to a coherent interconnect 28. In other embodiments, a given L2 cache may be shared by two or more processors 16A-16N, or a single L2 cache may be shared by all processors 16A-16N. In still other embodiments, the L2 caches 18A-18N may be eliminated and the processors 16A-16N may couple directly to the interconnect 28. The memory controller 20 is coupled to the interconnect 28, and to the memory 22. The interconnect 28, since it is used to communicate among the components within a node, is an intranode interconnect. The interconnect 14 is used to communicate among nodes, and thus is an internode interconnect.

The memory 22 in the node 12A and similar memories in other nodes 12B-12D may form a distributed shared memory for the system 10. In the illustrated embodiment, each node 12A-12D implements hardware-based coherence internally. The distributed shared memory may also be coherent. The coherence of the distributed shared memory may be maintained primarily in hardware, or primarily in software with certain hardware support, or completely in software, in various embodiments. For example, the processors 16A-16N may support a coherence trap for memory operations that require internode coherence activity to maintain coherency in the distributed shared memory. Coherence code may be executed in response to the trap, to ensure that internode coherence is maintained. Coherence activity may generally include one or more internode communications to establish a desired coherence state in a requestor who initiated a request for the coherence unit affected by the coherence activity.

Data belonging to another node 12B-12D is referred to as "remote data", a "remote cache line", etc. The address of such data is referred to as the "remote address". Addresses within memory 22 are referred to as local addresses, and the corresponding data is referred to as local data. Note that "remote" and "local" are relative to a given node. A given node is the "home node" for the local data in its memory 22. The coherence directory 32 may be the coherence directory for those coherence units for which the node 12A is the home node. The coherence controller 30 may use the coherence directory 32 to track the coherence state of the local coherence units in other nodes and to determine coherence activity for a given requesting node. In some cases, for example, shared copies of the data in other nodes may need to be invalidated and/or modified data may need to be fetched from another node to coherently provide data to the requesting node.

For the embodiment illustrated in FIG. 1, internode coherence may be maintained via the coherence controller 30 and the directory 32. The coherence controller 30 may receive coherence requests from the interconnect 14 (through the interface 26, in this embodiment) and from the interconnect 28. The coherence request may be a communication that identifies a coherence unit (e.g. by address) and requests that a specific coherence state be provided for that coherence unit to the requesting node. If the requesting node does not have a coherent copy of the coherence unit, the copy is provided in response to the request as well. For example, coherence requests may include a read to share request, which requests a readable copy of the coherence unit and write access is not requested; a read to own request, which requests read/write access to the coherence unit; and an upgrade request to upgrade from shared (read-only) state to a writeable state (e.g. exclusive, modified, or owned). Any set of coherence requests may be defined in various embodiments, and may be more briefly referred to herein as simply "requests".

The coherence controller 30 may read the directory entry in the coherence directory 32 corresponding to the requested coherence unit, and may determine if coherence activity is needed to coherently provide the requested coherence unit/requested coherence state to the requesting node. If so, the coherence controller 30 may initiate the coherence activity. The coherence controller 30 may also record, in some fashion (e.g. in the coherence directory entry), that coherence activity is being performed for the coherence unit. If a subsequent request for the same coherence unit is received while the coherence activity is still continuing, the coherence controller 30 may selectively initiate coherence activity for the subsequent request or block the subsequent request (preventing the coherence activity and effectively stalling the request) dependent on the type of the request. If the coherence activity is initiated while the coherence activity for the previous request is still continuing, the coherence activity of the two requests may be referred to as being in parallel. Some requests are relatively simple to provide parallel coherence activity for (e.g. a read to share request), while others are more complex (e.g. read to own or upgrade). The coherence controller 30 may initiate coherence activity in parallel for the simpler cases and block the more complex cases. On the other hand, if no coherence activity is outstanding when a request is processed by the coherence controller 30, the coherence activity may be initiated independent of the type of the request.

In one embodiment, coherence activity may be initiated for read to share type requests while coherence activity is outstanding for another request and may block other request types while coherence activity is outstanding. In some embodiments, whether or not the coherence activity is initiated in parallel with earlier coherence activity may depend on the type of the previous request as well. For example, one implementation may depend on the previous request being a read to share type as well. Other embodiments may be independent of the previous request type. The request type may generally refer to requests which request the same coherence state for the requested coherence unit.

By permitting coherence activity for some requests to a coherence unit to proceed in parallel with the coherence activity for a previous request to the same coherence unit, performance may be improved without unduly complicating the coherence protocol. More complex cases may be handled by blocking the request until coherence activity for the previous request is completed. Thus, the more complex cases are handled deterministically, which may simplify the coherence and the verification of correct functionality. Generally, a coherence protocol may define a set of coherence states as well as the communications used to maintain the coherence states among multiple coherence participants (e.g. nodes, in this case).

An example of initiating coherence activity in parallel and its effectiveness for one embodiment may be seen with respect to a semaphore memory location. Typically, such semaphores are used for interprocess communication, to control access to critical code/data that may be shared among processes, etc. Thus, one process (executing within a given node) may own the semaphore and one or more other processes (executing on other nodes) may be reading the location waiting for the release value to be written to the semaphore memory location. When the controlling process writes the semaphore location to release control, the remaining processes may all attempt to read the location. Since each read may obtain a shared copy, the reads may proceed in parallel in a relatively simple fashion. Thus, the last node to have its read serviced may not have to wait until each preceding read has been completed, reducing latency, in some embodiments.

A coherence state may generally be any representation of the permissions that a given node has for the corresponding data (e.g. read-only, read/write, etc.), and may also indicate whether or not other copies of the data may exist in other nodes. For example, the modified, exclusive, shared, and invalid (MESI) scheme has four states. The MOESI scheme includes the MESI states and an owned state.

As used herein, a memory operation may comprise any read or write of a memory location performed by a processor as part of executing an instruction. A load memory operation (or more briefly, a load) is a read operation that reads data from a memory location. A store memory operation (or more briefly, a store) is a write operation that updates a memory location with new data. The memory operation may be explicit (e.g. a load or store instruction), or may be an implicit part of an instruction that has a memory operand, based on the instruction set architecture (ISA) implemented by the processors 16A-16N.

Each processor 16A-16N may comprise circuitry for executing instructions defined in the instruction set architecture implemented by the processor. Any instruction set architecture may be used. Additionally, any processor microarchitecture may be used, including multithreaded or single threaded, superscalar or scalar, pipelined, superpipelined, in order or out of order, speculative or non-speculative, etc. In one embodiment, each processor 16A-16N may implement one or more level 1 (L1) caches for instructions and data, and thus the caches 18A-18N are level 2 (L2) caches. The processors 16A-16N may be discrete microprocessors, or may be integrated into multi-core chips. The processors 16A-16N may also be integrated with various other components, including the L2 caches 18A-18N, the memory controller 20, the I/O bridge 24, and/or the interface 26.

The L2 caches 18A-18N comprise high speed cache memory for storing instructions/data for low latency access by the processors 16A-16N. The L2 caches 18A-18N are configured to store a plurality of cache lines, which may be the unit of allocation and deallocation of storage space in the cache. The cache line may comprise a contiguous set of bytes from the memory, and may be any size (e.g. 64 bytes, in one embodiment, or larger or smaller such as 32 bytes, 128 bytes, etc.). The L2 caches 18A-18N may have any configuration (direct-mapped, set associative, etc.) and any capacity. Cache lines may also be referred to as cache blocks, in some cases.

The memory controller 20 is configured to interface to the memory 22 and to perform memory reads and writes responsive to the traffic on the interconnect 28. The memory 22 may comprise any semiconductor memory. For example, the memory 22 may comprise random access memory (RAM), such as static RAM (SRAM) or dynamic RAM (DRAM). Particularly, the memory 22 may comprise asynchronous or synchronous DRAM (SDRAM) such as double data rate (DDR or DDR2) SDRAM, RAMBUS DRAM (RDRAM), etc.

The I/O bridge 24 may comprise circuitry to bridge between the interconnect 28 and one or more I/O interconnects. Various industry standard and/or proprietary interconnects may be supported, e.g. peripheral component interconnect (PCI) and various derivatives thereof such as PCI Express, universal serial bus (USB), small computer systems interface (SCSI), integrated drive electronics (IDE) interface, Institute for Electrical and Electronic Engineers (IEEE) 1394 interfaces, Infiniband interfaces, HyperTransport links, network interfaces such as Ethernet, Token Ring, etc. In other embodiments, one or more interface circuits such as the interface 26 may directly couple to the interconnect 28 (i.e. bypassing the I/O bridge 24).

The coherent interconnect 28 comprises any communication medium and corresponding protocol that supports hardware coherence maintenance. The interconnect 28 may comprise, e.g., a snoopy bus interface, a point to point packet interface with probe packets included in the protocol (or other packets used for coherence maintenance), a ring interface, etc. The non-coherent interconnect 14 may not include support for hardware coherency maintenance. For example, in one embodiment, the interconnect 14 may comprise Infiniband. Other embodiments may use any other interconnect (e.g. HyperTransport non-coherent, various I/O or network interfaces mentioned above, etc.). In other embodiments, the interconnect 14 may include support for hardware coherence maintenance, but such support may not be used to maintain coherence over the distributed shared memory system.

The system 10 as a whole may have any configuration. For example, the nodes 12A-12D may be "blades" in a blade server system, stand-alone computers coupled to a network, boards in a server computer system, etc.

It is noted that, while 4 nodes are shown in the system 10 in FIG. 1, other embodiments may include any number of 2 or more nodes, as desired. The number of processors 16A-16N in a given node may vary, and need not be the same number as other nodes in the system.

Figure 2:
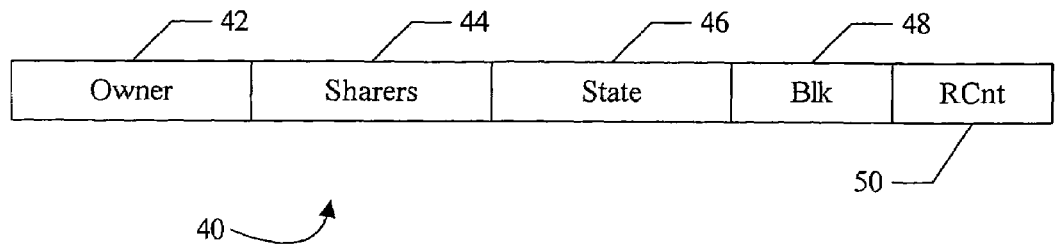
FIG. 2 is a block diagram of one embodiment of a coherence directory entry.

Turning now to FIG. 2, a block diagram of one embodiment of a directory entry 40 is shown. Generally, the coherence directory 32 may comprise a plurality of entries similar to entry 40, one entry for each coherence unit tracked in the coherence directory 32. The coherence directory 32 may be indexed by the address of the coherence unit, less the address bits that are an offset within the coherence unit (e.g. the cache line offset bits, if a coherence unit is a cache line). The directory entry 40 includes an owner field 42, a sharers field 44, a state field 46, a block bit 48, and a request count (RCnt) field 50. The owner field 42 may identify the current owner of the coherence unit, which may be the home node if there is no remote owner. For example, the owner field may store a node number of the owner.

The sharers field 44 may identify one or more sharers of the data, if any. For example, the sharers field 44 may be a bit vector with a bit for each possible node. The bit may be set to indicate that the node is a sharer and clear to indicate that the node is not a sharer. Other embodiments may reverse the set and clear states of the bits. Still other embodiments may use a list of node numbers in the sharers field, or any other indication. The state field 46 may indicate the coherence state of the coherence unit in the owner node, according to the coherence states implemented by the system.

The block bit 48 may be set to indicate that one or more previous requests are in progress (that is, coherence activity is still continuing for the previous request or requests). The block bit 48 may be clear otherwise. Other embodiments may reverse the set and clear state of the bits, or may use any other indication. The RCnt field may be used to count the number of requests for which coherence activity is continuing.

Any hardware or software coherence protocol may be used to coherently transfer data to the requesting node. It is noted that coherence may be maintained at a coarser or finer grain than a cache line, in various embodiments.

Figure 3:
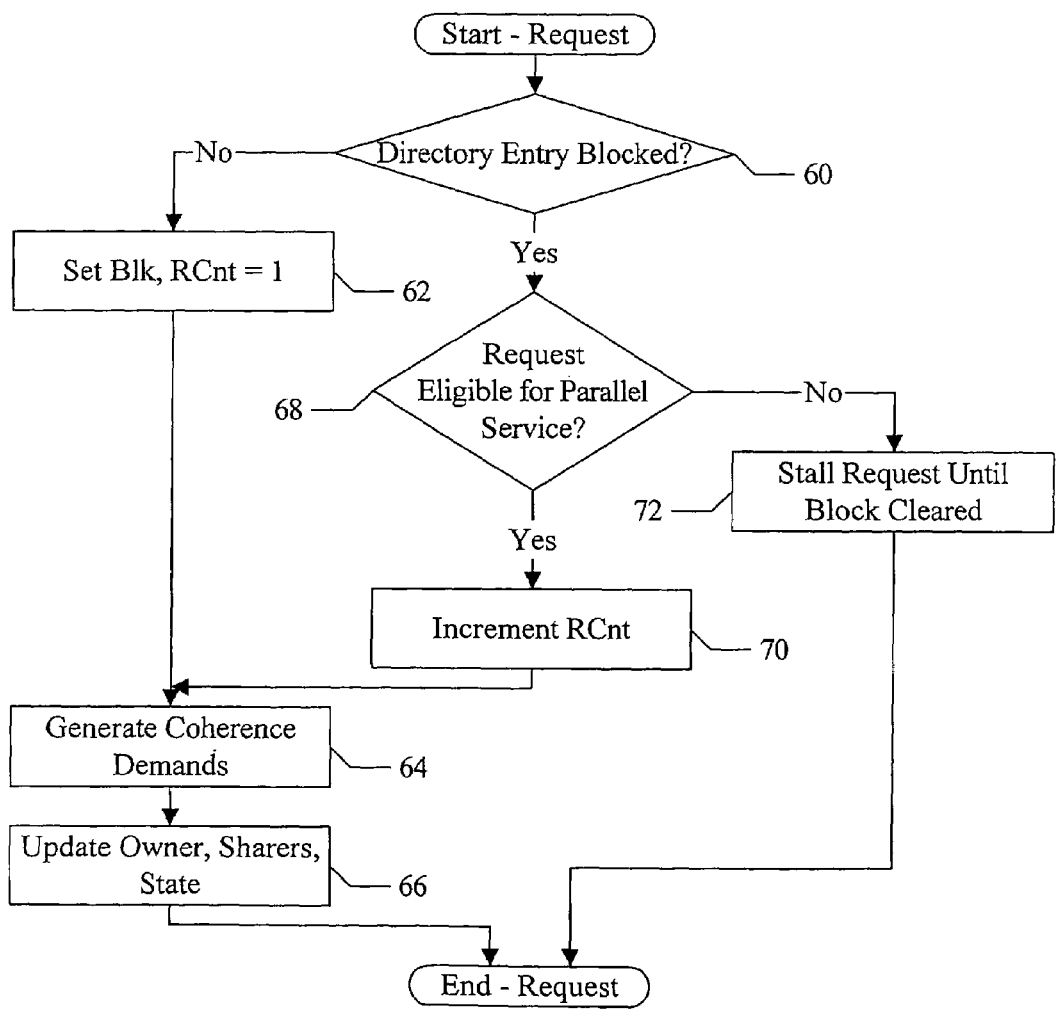
FIG. 3 is a flowchart illustrating operation of one embodiment of a coherence controller in response to a coherence request.

Turning next to FIG. 3, a flowchart is shown illustrating operation of one embodiment of the coherence controller 30 in response to receiving a request. While the blocks are shown in a particular order for ease of understanding, other orders may be used. If the coherence controller 30 is implemented in hardware, the blocks may be performed in parallel in combinatorial logic within the coherence controller 30 and/or blocks, combinations of blocks, or the flowchart as a whole may be pipelined over multiple clock cycles. In other embodiments, the coherence controller 30 may be implemented in software, and the software may comprise instructions which, when executed, implement the operation shown in FIG. 3.

The coherence controller 30 may access the directory entry in the coherence directory 32 that corresponds to the requested coherence unit. If the blocked bit is clear (and thus there is no ongoing coherence activity with respect to the requested coherence unit—decision block 60, "no" leg), the coherence controller 30 may set the block bit, and may initialize the RCnt to one (block 62). The coherence controller 30 may initiate coherence activity for the coherence unit. For example, the coherence controller 3Q may generate one or more coherence demands, dependent on the information in the directory entry (block 64). Generally, coherence demands are communications transmitted by the home node of a coherence unit to one or more other nodes that have copies of the coherence units (referred to as slave nodes). The coherence demands may require coherence state changes in the slave nodes and/or transmission of the coherence unit (e.g. if the slave node has a modified copy of the coherence unit). The coherence controller 30 may also update the owner field 42 and sharers field 44, if necessary, to indicate the coherence state of the coherence unit after completion of the coherence activity (block 66).

If the block bit is set in the directory entry (and thus there is continuing coherence activity for the coherence unit corresponding to a previous request—decision block 60, "yes" leg), the coherence controller 30 may determine if the current request is eligible for parallel service (decision block 68). That is, dependent on the type of the current request and optionally the type of the previous request, the coherence controller 30 may determine if coherence activity may be initiated for the current request prior to completing the coherence activity for the previous request. If so (decision block 68, "yes" leg), the coherence controller 30 may increment the RCnt in the directory entry. The coherence controller 30 may also initiate coherence activity (e.g. generating the coherence demands—block 64) and may update the owner and sharers fields in the directory entry, as appropriate (block 66). On the other hand, if parallel service is not supported (decision block 68, "no" leg), the coherence controller 30 may stall the request until the block bit is cleared in the entry (block 72).

Figure 4:
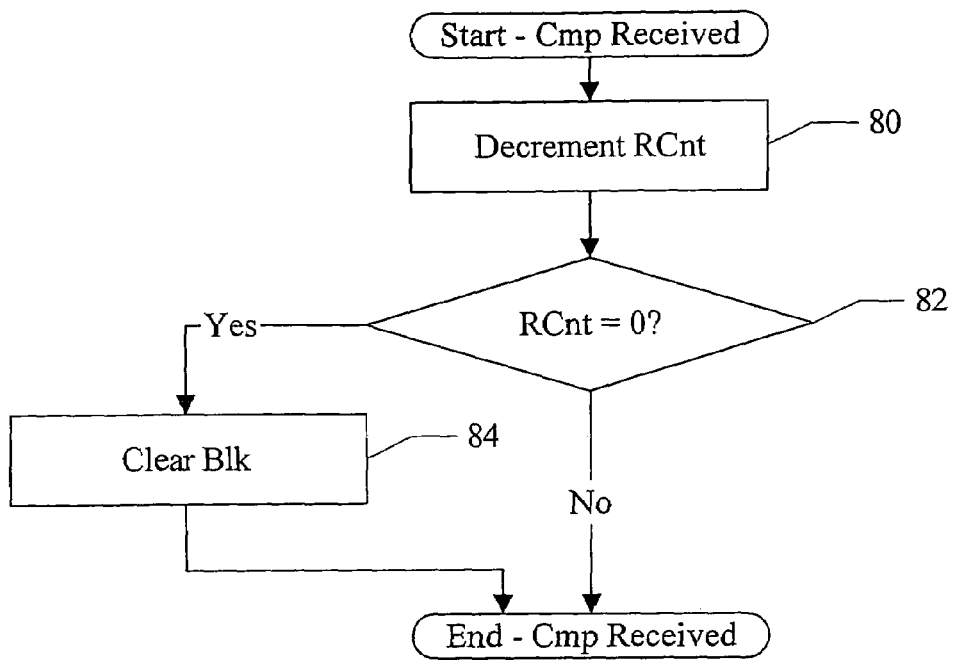
FIG. 4 is a flowchart illustrating operation of one embodiment of a coherence controller in response to a completion.

Turning next to FIG. 4, a flowchart is shown illustrating operation of one embodiment of the coherence controller 30 in response to receiving a completion of a request for which coherence activity was previously initiated. Generally, a completion may be any indication that the coherence activity for a given request is complete. In some embodiments, the completion may be a communication received by the home node. In other embodiments, the home node may generate and transmit the completion communication. While the blocks are shown in a particular order for ease of understanding, other orders may be used. If the coherence controller 30 is implemented in hardware, the blocks may be performed in parallel in combinatorial logic within the coherence controller 30 and/or blocks, combinations of blocks, or the flowchart as a whole may be pipelined over multiple clock cycles. In other embodiments, the coherence controller 30 may be implemented in software, and the software may comprise instructions which, when executed, implement the operation shown in FIG. 4.

The coherence controller 30 may access the directory entry corresponding to the completion, and may decrement the RCnt field in the entry (block 80). If the RCnt field is zero (decision block 82, "yes" leg), there is no more coherence activity outstanding for the coherence unit. Thus, the coherence controller 30 may clear the block bit (block 84).

While the illustrated embodiment tracks continuing coherence activity and the number of requests for which such activity is continuing using the block bit and the RCnt field in the entry, other embodiments may track the activity in other fashions (e.g. in a queue of outstanding requests, in a memory, etc.).

Figure 5:
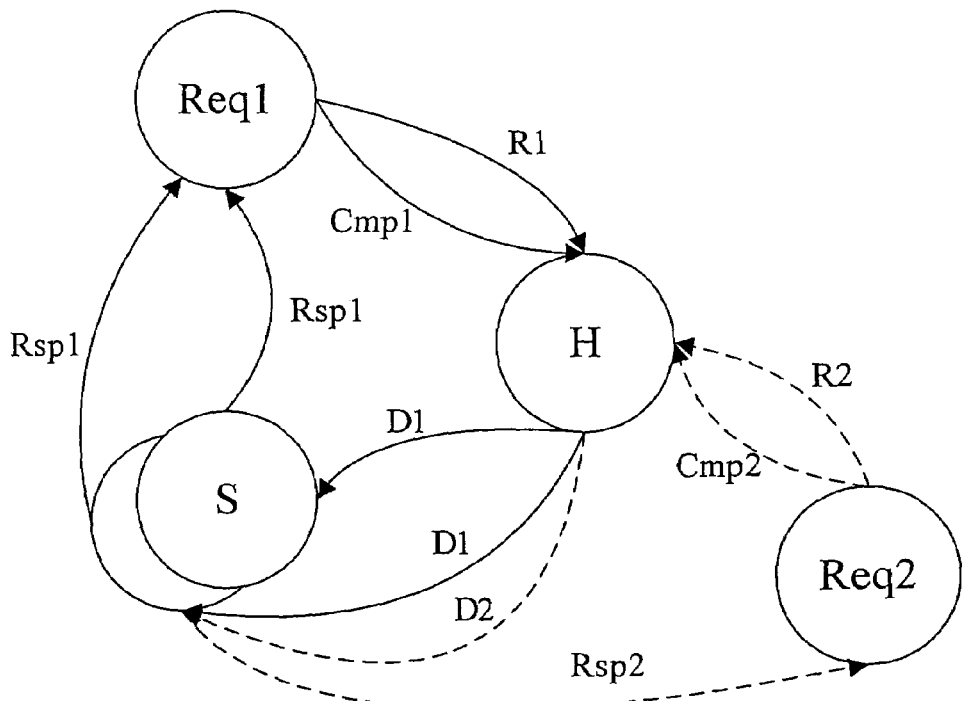
FIG. 5 is a block diagram illustrating one embodiment of coherence activity for a pair of coherence requests.

Turning now to FIG. 5, a block diagram of one embodiment of communications between nodes for a pair of requests is shown, for one embodiment of a coherence protocol. The nodes are illustrated as circles, with requestor nodes identified as Req1 and Req2, a home node identified as H, and one or more slave nodes identified as S. It is noted that the particular node that is the home node depends on the requested coherence unit, and which nodes are the slave nodes, if any, depends on which nodes have copies of the requested coherence unit. A request R1 is shown from requestor node Req1, and corresponding communications among the nodes are indicated by solid arrows.

A request R2 is shown from the requestor node Req2, and corresponding communications are illustrated via dashed lines.

In the embodiment of FIG. 5, a request is initiated by the requestor node transmitting the request to the home node (e.g. Req1 node transmits the request R1 to the home node H). The home node transmits coherence demands for the requested coherence unit to the slave nodes (D1 in FIG. 5). The slave nodes make the coherence state changes indicated by the coherence demands, and transmit the responses to the requestor node Req1 (Rsp1 in FIG. 5). The responses may indicate that the coherence state changes have been made (e.g. invalidating the copy of the coherence unit, or changing the coherence state to shared for the coherence unit). A response from one of the slave nodes may also include data, if the slave node has an owned or modified copy. If no slave node has an owned or modified copy, the home node may provide the data. Once all the responses are received by the requestor node, the requestor node transmits a completion to the home node indicating that the coherence activity for the request R1 is complete (Cmp1 in FIG. 5).

Similarly, for the request R2 from the requestor node Req2 in FIG. 5, the home node transmits the coherence demand D2 to the slave node(s). In this example, only one coherence demand is transmitted for the request R2, e.g., if only one slave node has a copy of the requested coherence unit. The slave node transmits the response (Rsp2) to the requestor node Req2, which transmits the completion Cmp2 to the home node.

The coherence activity for the two requests R1 and R2 may be performed in parallel if the requests are for different coherence units. Additionally, the coherence activity may be performed in parallel dependent on the type of the second request R2 (and optionally dependent on the type of the first request R1, in some embodiments).

Figure 6:
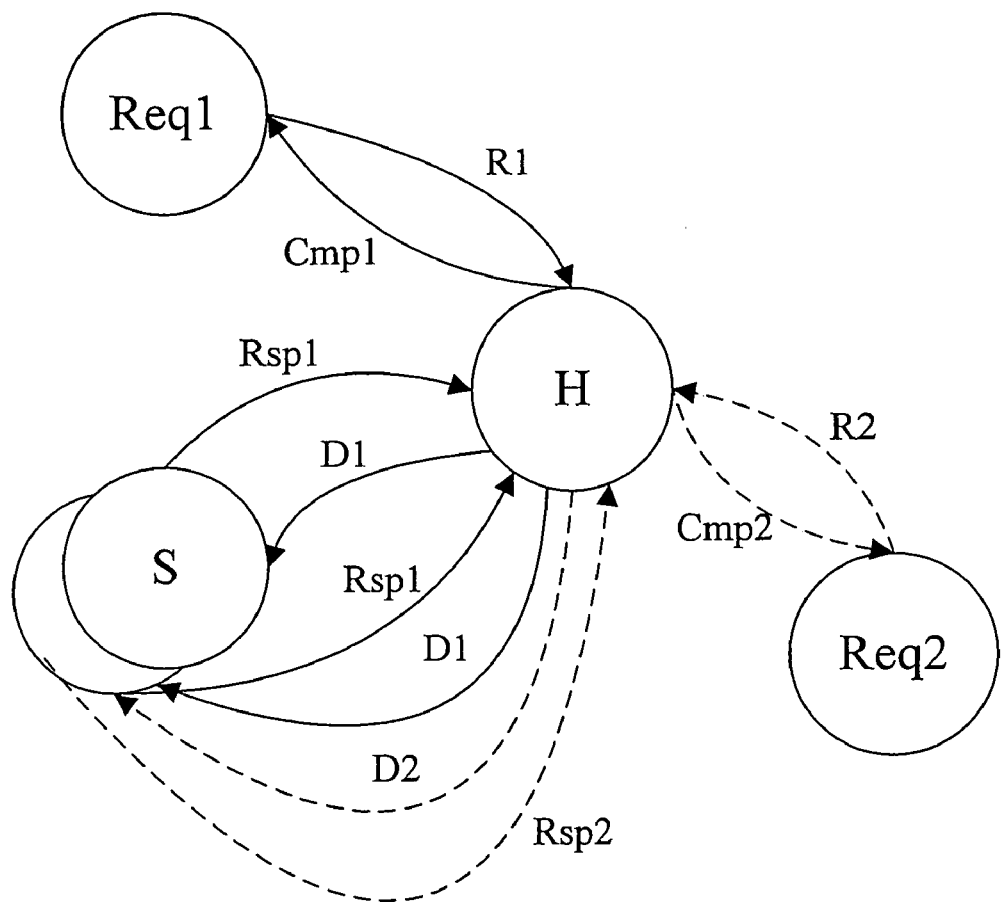
FIG. 6 is a block diagram illustrating another embodiment of coherence activity for a pair of coherence requests.

FIG. 6 is another example of communications among the nodes for another embodiment of the coherence protocol. In this example, the responses of the slave nodes are transmitted to the home node, which transmits the completion to the requestor nodes Req1 and Req2. Again, the coherence activity for the two requests may proceed in parallel if the requests are for different coherence units or if the requests are to the same coherence unit for certain types of requests.

As mentioned above, the coherence controller 30 may be implemented in hardware, software, or any combination thereof. Hardware implementations may be coupled to various interfaces to receive various communications. Software implementations may be executed, directly or indirectly, by a processor in the node, and may be coupled to receive communications through memory (e.g. the communications may be written to the memory, and the corresponding coherence code may be invoked to process the communication). In software embodiments, the coherence directory 32 may be stored in the memory as well.

Figure 7:
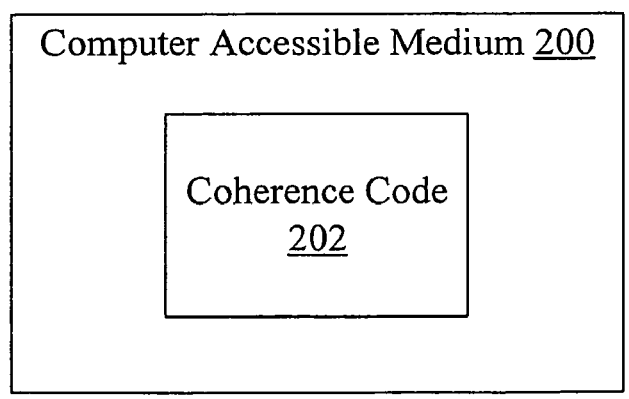
FIG. 7 is a block diagram of one embodiment of a computer accessible medium.

Turning now to FIG. 7, a block diagram of a computer accessible medium 200 is shown. Generally speaking, a computer accessible medium may include any media accessible by a computer during use to provide instructions and/or data to the computer.

For example, a computer accessible medium may include storage media. Storage media may include magnetic or optical media, e.g., disk (fixed or removable), tape, CD-ROM, or DVD-ROM, CD-R, CD-RW, DVD-R, DVD-RW. Storage media may also include volatile or non-volatile memory media such as RAM (e.g. synchronous dynamic RAM (SDRAM), Rambus DRAM (RDRAM), static RAM (SRAM), etc.), ROM, or Flash memory. Storage media may include non-volatile memory (e.g. Flash memory) accessible via a peripheral interface such as the Universal Serial Bus (USB) interface in a solid state disk form factor, etc. The computer accessible medium may include microelectromechanical systems (MEMS), as well as media accessible via transmission media or signals such as electrical, electromagnetic, or digital signals, conveyed via a communication medium such as a network and/or a wireless link. The computer accessible medium 200 in FIG. 7 may store coherence code 202 and, if desired, the coherence directory 32. The coherence code 202 may comprise instructions which, when executed, implement the operation described herein for the coherence code (e.g. up to all of the functionality of the coherence controller 30). Generally, the computer accessible medium 200 may store any set of instructions which, when executed, implement a portion or all of the flowcharts shown in FIGS. 3 and 4.

Numerous variations and modifications will become apparent to those skilled in the art once the above disclosure is fully appreciated. It is intended that the following claims be interpreted to embrace all such variations and modifications.

What is claimed is:

1. A node for a multi-node computer system, the node comprising:
   a coherence directory comprising a plurality of entries, wherein each entry corresponds to a respective coherence unit and stores a state identifying which nodes in the computer system are storing a copy of the coherence unit and further identifying a coherence state of the coherence unit according to a coherence protocol implemented in the computer system; and
   a coherence controller coupled to the directory and coupled to receive a first request for a requested coherence unit having a first entry in the coherence directory, and wherein the coherence controller is coupled to receive a second request for the requested coherence unit, and wherein the coherence controller is configured to selectively initiate coherence activity for the second request, prior to a completion of coherence activity for the first request, dependent on a type of the second request, wherein the first request is transmitted by a first requesting node, and wherein the first request identifies the requested coherence unit and requests that a specified coherency state for the requested coherence unit be provided to the first requesting node, and wherein the second request is transmitted by a second requesting node different from the first requesting node, and wherein the second request identifies the requested coherence unit and requests that a specified coherency state for the requested coherence unit be provided to the second requesting node.

2. The node as recited in claim 1 wherein the coherence controller is configured to selectively initiate coherence activity for the second request further dependent on a type of the first request.

3. The node as recited in claim 1 wherein the second request is a read request for shared access to the requested coherence unit.

4. The node as recited in claim 3 wherein, if the second request is not the read request for shared access, the coherence controller is configured to block the second request until the coherence activity for the first request is completed.

5. The node as recited in claim 1 wherein the first entry includes a count of outstanding requests, and wherein the count is set to one for the first request, and wherein the count is incremented for the second request if the coherence activity for the second request is initiated before the coherence activity for the first request is completed.

6. The node as recited in claim 5 wherein the coherence controller is configured to decrement the count in response to completing the coherence activity for one of the first request and the second request.

7. The node as recited in claim 6 wherein the coherence controller is coupled to receive a completion from the requestor.

8. The node as recited in claim 6 wherein the coherence controller is configured to generate the completion and transmit the completion to the requestor.

9. The node as recited in claim 1 wherein the coherence controller is configured, if the coherence activity for the first request is complete, to initiate coherence activity for the second request independent of the type of the second request.

10. The node as recited in claim 1 wherein the coherence controller comprises hardware circuitry configured to access the coherence directory.

11. The node as recited in claim 1 wherein the coherence controller comprises coherence code executable on a processor in the node.

12. A method comprising:
   receiving a first request for a requested coherence unit from a first requesting node, and the first request identifies the requested coherence unit and requests that a specified coherency state for the requested coherence unit be provided to the first requesting node, and the requested coherence unit has a corresponding entry in a coherence directory, wherein the corresponding entry stores a state identifying which nodes in a multi-node computer system are storing a copy of the coherence unit and further identifying a coherence state of the coherence unit according to a coherence protocol implemented in the computer system;
   receiving a second request for the requested coherence unit prior to completing coherence activity for the first request, the second request from a second requesting node, and the second request identifies the requested coherence unit and requests that a specified coherency state for the requested coherence unit be provided to the second requesting node; and
   selectively initiating coherence activity for the second request, prior to a completion of coherence activity for the first request, dependent on a type of the second request.

13. The method as recited in claim 12 wherein selectively initiating the coherence activity for the second request is further dependent on a type of the first request.

14. The method as recited in claim 12 wherein the second request is a read request for shared access to the requested coherence unit.

15. The method as recited in claim 14 further comprising, if the second request is not the read request for shared access, blocking the second request until the coherence activity for the first request is completed.

16. The method as recited in claim 12 further comprising, if the coherence activity for the first request is complete, initiating coherence activity for the second request independent of the type of the second request.

17. A system comprising:
   a first node configured to transmit a first request for a requested coherence unit, the first request identifying the requested coherence unit and requesting that a specified coherency state for the requested coherence unit be provided to the first node;
   a second node configured to transmit a second request for the requested coherence unit, the second request identifying the requested coherence unit and requesting that a specified coherency state for the requested coherence unit be provided to the second node; and
   a third node coupled to the first node and the second node, wherein the third node comprises a coherence directory comprising a plurality of entries, wherein each entry corresponds to a respective coherence unit and stores a state identifying which nodes in the system are storing a copy of the coherence unit and further identifying a coherence state of the coherence unit according to a coherence protocol implemented in the system, and wherein the third node is configured to initiate coherence activity for the first request, and wherein the third node is configured to selectively initiate coherence activity for the second request, prior to a completion of coherence activity for the first request, dependent on a type of the second request.

18. The system as recited in claim 17 wherein the third node is configured to selectively initiate coherence activity for the second request further dependent on a type of the first request.

19. The system as recited in claim 17 wherein the second request is a read request for shared access to the requested coherence unit.

20. The system as recited in claim 19 wherein, if the second request is not the read request for shared access, the coherence controller is configured to block the second request until the coherence activity for the first request is completed.

* * * * *